Jan. 31, 1950   A. P. LIEN ET AL   2,495,852
DECOLORIZING ORGANIC SUBSTANCES
Filed Feb. 28, 1947   2 Sheets-Sheet 1

Inventors:-
Arthur P. Lien
Bernard L. Evering
Bernard H. Shoemaker
By Arthur H. Bransky
Attorney Inventors:-
Arthur P. Lien
Bernard L. Evering
Bernard H. Shoemaker
By Arthur H. Bransky
Attorney Patented Jan. 31, 1950

2,495,852

UNITED STATES PATENT OFFICE 2,495,852

DECOLORIZING ORGANIC SUBSTANCES

Arthur P. Lien, Hammond, Ind., Bernard L. Evering, Chicago, Ill., and Bernard H. Shoemaker, Hammond, Ind., assignors to Standard Oil Company, Chicago, Ill., a corporation of Indiana Application February 28, 1947, Serial No. 731,444

14 Claims. (Cl. 196—14.25)

This invention relates to the decolorization of organic substances, particularly hydrocarbons or mixtures of hydrocarbons. More particularly, the invention relates to the decolorization of hydrocarbon oils, particularly petroleum oils and petroleum oil fractions and hydrocarbon waxes.

This invention finds application in many industries. For example, in the manufacture of hydrocarbon oils such as petroleum oils, particularly viscous petroleum oils such as lubricating oils, it is highly desirable that the color bodies or color-forming bodies be removed from such products in order to obtain a finished product which is of good color and substantially free of color bodies which are largely responsible for the formation of sludge and/or varnish during use or storage. Furthermore, in the treatment of petroleum oils it is frequently the practice to extract such products with a solvent, such as for example phenol, furfural, nitrobenzene, Chlorex (beta, beta dichloroethyl ether), etc. to remove therefrom aromatics and/or naphthenes which are responsible in a large measure for the dark color of such materials. The extracts resulting from such solvent extraction processes can be used as plasticizers and for other purposes; however, because of their very dark color, such extracts are not extensively used. Other organic substances which are frequently improved by decolorization are natural fats and fatty oils, such as animal, vegetable and marine fats and oils, such as tung oil, linseed oil, rapeseed oil, fish oil, tallow, etc., as well as terpenes, such as rosin, ester waxes, such as sperm oil, etc.

It is an object of the present invention to provide an improved method of decolorizing organic substances, such as hydrocarbon oils and waxes, natural fats and fatty oils, ester waxes, rosin, etc. Another object of the present invention is to provide a method of decolorizing hydrocarbon oils and hydrocarbon oil fractions. Still another object of the present invention is to provide an improved method of decolorizing viscous hydrocarbon oils. A further object of the invention is to provide a method of improving the color of extracts resulting from the solvent extraction of hydrocarbon oils, such as petroleum oils.

Figure 1:
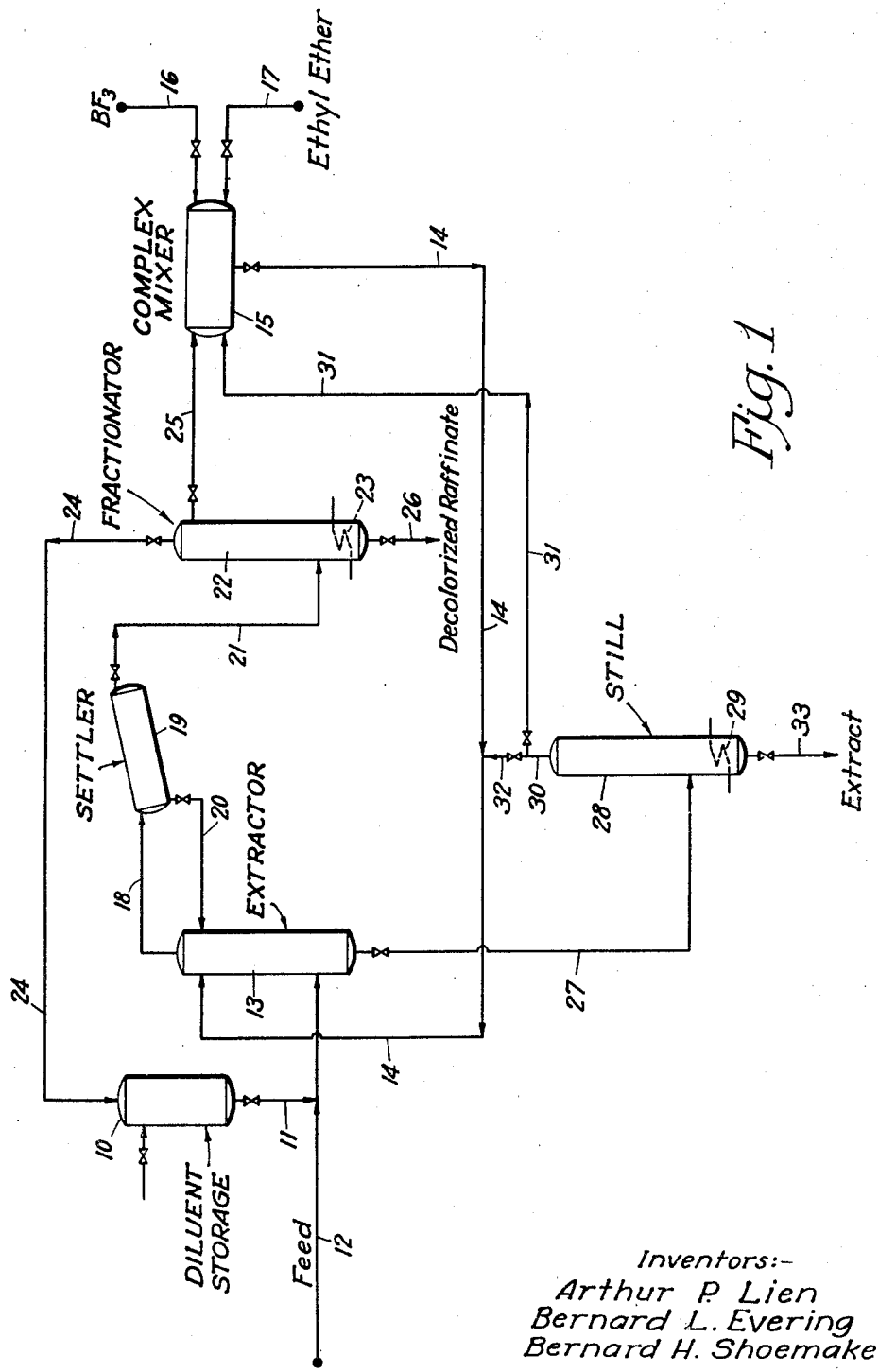
Figure 2:
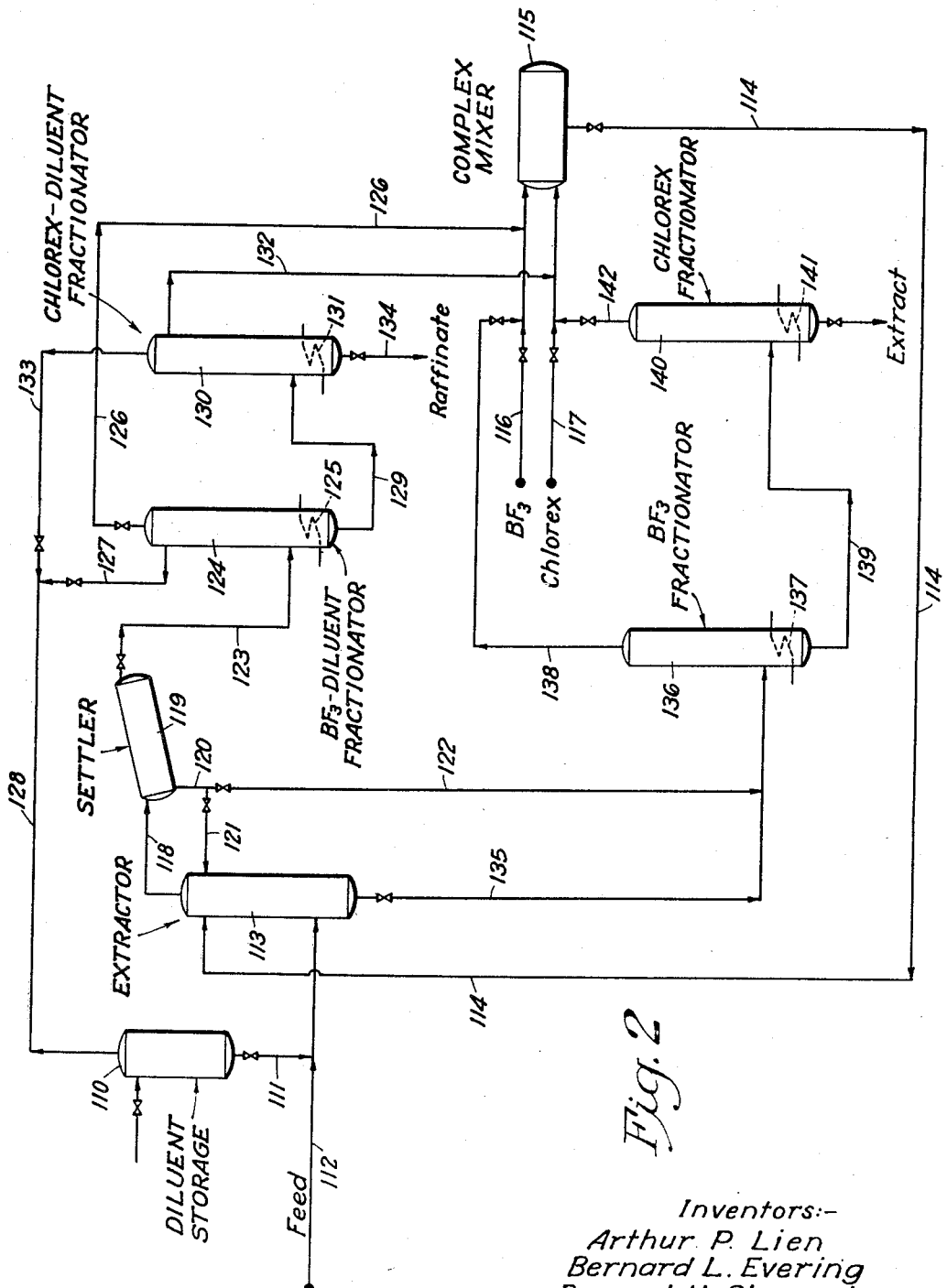

Other objects and advantages of the present invention will become apparent from the following description thereof read in conjunction with the accompanying drawings which form a part of the specification and in which Figure 1 is a flow diagram of carrying out the invention, and Figure 2 is a flow diagram of a modified method of carrying out the invention.

In accordance with the present invention, organic materials, such as for example hydrocarbons or mixtures of hydrocarbons, for example hydrocarbon oils such as petroleum oils and petroleum oil fractions, natural fats and oils, and rosin are effectively decolorized by extracting such materials with a solvent comprising essentially a complex of boron fluoride with an oxygenated organic compound or halogen, preferably chlorine, derivatives of such oxygenated organic compounds, said solvent being employed in conjunction with a diluent, preferably one having a relatively low boiling point, for example from about 90° F. to about 300° F., and substantially free of aromatic hydrocarbons. Preferably, the diluent is an aliphatic hydrocarbon having from about 3 to about 7 carbon atoms in the molecule, such as propane, butane, pentane, hexane or heptane although other hydrocarbons heavier than heptane can be used.

While the complexes of boron fluoride with aliphatic or aromatic oxygenated compounds can be used, we prefer to employ complexes of boron fluoride with an oxygenated alkane compound selected from the class consisting of ethers, esters and acids, having not more than about 5 and preferably not more than 3 carbon atoms in the alkyl group, and the halogen, preferably chlorine, derivatives thereof.

Specific examples of organic oxygenated compounds which can be employed for forming the boron fluoride complexes are the following:

| | |
|---|---|
| Methyl ether | Methyl formate |
| Ethyl ether | Ethyl formate |
| Propyl ether | Butyl formate |
| Butyl ether | Ethyl propionate |
| Amyl ether | Acetic acid |
| Phenol | Formic acid |
| Methyl ethyl ether | Propionic acid |
| Methyl acetate | Anisol |
| Ethyl acetate | Pyran |
| Propyl acetate | Tri - tetra and penta- |
| Amyl acetate | methylene oxides | and the halogenated, preferably chlorinated, derivatives of the above, as for example B,B' dichloroethyl ether (Chlorex), chloroacetic acid, etc.

While complexes of boron fluoride with oxygenated organic compounds as a class are effective solvents for effecting a separation of color bodies from hydrocarbon mixtures, they are all not equal in their effectiveness and may vary with different complexes, with the composition of the mixture being extracted and with the conditions of extraction, as will be described hereinafter.

The boron fluoride complexes are readily prepared by bubbling a slight molar excess of boron fluoride through the oxygenated compound, e. g., ether, ester, acid, etc., and then subjecting to reduced pressure to remove the excess boron fluoride. In some cases, it is desirable to carry out the $BF_3$ stripping step at lower than room temperature in order to avoid decomposition of the complex. The residual product is a complex of a mol to mol ratio of boron fluoride to the oxygenated organic compound. The complexes suitable for the herein described invention are liquid or solids which melt slightly above room temperature, e. g. about 100° F. to about 150° F.

Under certain conditions, it is desirable to use a small amount of excess boron fluoride sufficient to give a partial pressure of from about one pound or less to about 150 pounds per square inch in conjunction with the herein described complexes in order to effect improved extraction. Our invention also contemplates the use of small amounts of HF in conjunction with the boron fluoride complexes.

The choice of any particular organic oxygenated compounds used in forming the boron fluoride complex will depend upon the feed to be treated, with due consideration being given to the boiling point of the complex in relation to the boiling range of the feed material and the extract to be obtained therefrom. For example, the boron fluoride-methyl ether or boron fluoride-ethyl ether complexes boil at relatively low temperatures, namely 258° to 262° F. Therefore, if the extracted material boils in this temperature range, it is preferable to use, as will be described hereinafter, a complex which is recovered by dissociation into $BF_3$ and organic compound, in which case the organic compound should have a boiling point higher than the extracted material. In most cases complexes having a boiling point lower than that of the extracted material will be used, in which case the complex can be recovered by distilling or flashing off the same from the extract.

The diluent referred to above plays an important role in the present invention. It acts to insure more efficient contact between the boron fluoride complex and the material being extracted, and also acts as a counter-solvent for keeping the aromatics, if present, in the raffinate, thus making for a more selective separation of the color bodies with less change in the aromaticity of the raffinate. The diluent can be used in amounts varying from about 50 to about 500 volume percent, based on the feed stock, and preferably greater than 100 volume percent, and more specifically from about 100 to about 200 volume percent.

The extraction can be carried out over a wide temperature range of about −50° F. to about 150° F., or higher and preferably from about 40° F. to about 100° F. under anhydrous conditions. The quantity of complex used should be sufficient to give a diphasic separation, and depending upon the material being extracted can vary from about 10 volume percent to about 200 volume percent or more, based on hydrocarbon feed, exclusive of the diluent, and preferably from about 50 volume per cent to about 100 volume percent, although in some cases as little as about 5 volume percent or less will give a satisfactory diphasic separation. A pressure sufficient to keep the materials in a liquid phase should be maintained in the extractor.

The following procedure of decolorizing a colored lubricating oil stock with a boron fluoride-ethyl ether complex is given by way of illustration only and is not intended to be a limitation of our invention. Referring to Figure 1, a dark colored stock, e. g. the extract obtained from extraction of a lubricating oil with conventional solvents, together with about 200 volume percent of a diluent, such as pentane, from storage tank 10 and through line 11, are introduced via line 12 into the bottom portion of an extractor 13, and countercurrently contacted with a boron fluoride-ethyl ether complex introduced into the upper portion of the extractor 13 through line 14. The extractor 13 is suitably a packed column, although other known suitable means of obtaining intimate contact can be employed. The boron fluoride-ethyl ether complex introduced into the extractor 13 via line 14 is suitably obtained from a forming zone identified in the drawing as the complex mixer 15. Boron fluoride and ethyl ether for forming the complex and/or for makeup are introduced into the complex mixer 15 via lines 16 and 17, respectively.

The raffinate is removed overhead from the extractor 13 through a line 18 and introduced into a settler 19 wherein any carryover complex is settled out and returned to the extractor 13 through line 20. The raffinate free of carryover complex is withdrawn from the settler 19 through line 21 and introduced into the bottom portion of a fractionator 22 provided with suitable heating means such as a heating coil 23. In the fractionator 22, the diluent, pentane, is recovered as an overhead and returned to the diluent storage tank 10 through line 24, while the boron fluoride-ethyl ether complex is recovered as a side cut and suitably passed to the complex mixer 15 via line 25. The decolorized raffinate, substantially free of diluent and boron fluoride complex is withdrawn from the fractionator 22 through line 26. It is to be understood, of course, that if the feed stock to be decolorized distils below the boiling point of the complex, the decolorized raffinate, will of course, be recovered from the fractionator as a suitable side cut and the complex withdrawn from the fractionator as a bottom. Likewise, if the diluent distils at a temperature above the distillation temperature of the feed stock, the decolorized raffinate may be recovered as overhead and the diluent as a side cut.

The extract from the extractor 13 is withdrawn therefrom through line 27 and introduced into still 28 equipped with suitable heating means such as a heating coil 29. Still 28 may, if desired, be operated at reduced pressure. The contents of still 28 are maintained at a temperature sufficient to remove therefrom the boron fluoride-ethyl ether complex as an overhead, which is either sent to the complex mixer 15 via lines 30 and 31 or recycled to the extractor 13 via lines 30, 32 and 14. The extract, substantially free of complex, is withdrawn from the still 28 through line 33. It is to be understood, of course, that depending upon the relative boiling points of the extract and the boron fluoride complex, under certain conditions the complex may be withdrawn from the still 28 as a bottom fraction and the extract as an overhead fraction or a side cut.

The foregoing example illustrates a method of carrying out the herein described invention under certain conditions in which the boron fluoride complex dissociates but is not decomposed by distillation. However, certain boron fluoride complexes are decomposed into boron fluoride and the oxygenated organic compound when subjected to distillation, even under reduced pressure. When employing such complexes they cannot be recovered as in the hereinbefore described method. The following example illustrates one method of carrying out the invention employing a boron fluoride complex which is decomposable under distillation conditions. For the purpose of illustration, the following procedure provides a method of carrying out the invention employing a boron fluoride-Chlorex (beta, beta dichloroethyl ether) complex, hereinafter referred to as a boron fluoride-Chlorex complex.

Referring to Figure 2, the feed to be decolorized, for example a lubricating oil extract stock, together with about 200 volume percent of a diluent, such as pentane from diluent storage tank 110 and line 111 are introduced via line 112 into the extractor 113 and countercurrently contacted with a boron fluoride-Chlorex complex introduced into the upper portion of the extractor 113 from a complex forming zone, identified in the drawing as the complex mixer 115 via line 114. Boron fluoride and Chlorex for forming the complex or as make-up can be introduced into the complex mixer 115 through lines 116 and 117, respectively.

The raffinate from the extractor 113 is removed overhead through line 118 to a settler 119 wherein any entrained boron fluoride-Chlorex complex is settled out and recycled to the extractor 113 through lines 120 and 121 or may be passed through line 120 and 122 to a complex recovery unit as hereinafter described. The raffinate from the settler 119 is passed through line 123 to a fractionator 124 provided with a suitable heating means such as a heating coil 125. In the fractionator 124 any carryover boron fluoride-Chlorex complex is decomposed and the boron fluoride removed overhead through line 126, and recycled to the complex mixer 115 or to the boron fluoride supply source (not shown) via line 116. The diluent in this case, pentane, is recovered from the fractionator 124 as a side cut and recycled to the diluent storage tank 110 via lines 127 and 128. The bottoms from the fractionator 124 comprising raffinate and Chlorex are withdrawn through line 129 and introduced into the fractionator 130 provided with suitable heating means 131. Chlorex is recovered from the fractionator 130 as a side cut fraction and withdrawn therefrom via line 132 and passed either to the complex mixer 115 or to the Chlorex supply source (not shown) via line 117. Any diluent carried over from the fractionator 124 is withdrawn from the fractionator 130 as an overhead via line 133 and recycled to the diluent storage tank 110 through line 128. Raffinate substantially free of the complex and diluent is withdrawn from the fractionator 130 through the line 134. Obviously, in the event the product being decolorized has a lower boiling point than the Chlorex, the decolorized product will be taken overhead from the fractionator 130 and the Chlorex will be withdrawn from the fractionator 130 as a bottom and passed to the complex mixer 115 or to the Chlorex supply source.

The extract from the extractor 113 comprising boron fluoride-Chlorex complex and the extracted material from the feed stock is removed from the extractor 113 through line 135 and introduced into a fractionator 136 provided with suitable heating means such as heating coil 137 for maintaining a bottom temperature of about 180° F. to about 400° F. in the fractionator. Boron fluoride-Chlorex complex from the settler 119 may be introduced into the fractionator 136 via lines 120, 122 and 135. Boron fluoride-Chlorex complex is decomposed in the fractionator 136 and the boron fluoride taken overhead through line 138 and passed either to the boron fluoride supply source (not shown) or to the complex mixer 115 via line 116. Bottoms from the fractionator 136 are withdrawn through line 139 and introduced into fractionator 140 provided with suitable heating means such as heating coil 141. Fractionator 140 is operated under conditions to effect a separation of Chlorex and extract, the former usually being removed therefrom as an overhead through line 142, and passed either to the complex mixer 115 or to the Chlorex supply source (not shown) via line 117. The extract substantially free of the complex is removed from the fractionator 140 through line 143. It will be understood, of course, that the Chlorex may be withdrawn as a bottom product from the fractionator 140 and the extract as an overhead if the boiling range of the extract is below the boiling range of the Chlorex.

The boron fluoride Chlorex mixer 115 is operated under conditions to prevent excessive temperature due to the heat of reaction between the boron fluoride and the Chlorex.

While we have shown the separation of boron fluoride and Chlorex in separate fractionators, it is obvious that the decomposition and separation of boron fluoride and Chlorex can be accomplished in a single tower, if desired.

While we have described a continuous boron fluoride-Chlorex extraction process, the stock to be treated may be mixed with the Chlorex in a batchwise process and the boron fluoride bubbled through the homogeneous solution to the point of providing one mole $BF_3$ per mole of Chlorex or to the point of saturation. The resulting mixture can then be settled to give a raffinate phase and a lower $BF_3$ complex-extract phase.

The effectiveness of the herein described boron fluoride complexes in decolorizing organic materials is demonstrated by the extraction of an East Texas gas oil cycle stock with various boron fluoride complexes at about 75° F., using one volume of the complex to each volume of oil. The results obtained are tabulated in Table I together with the results obtained with several well known solvents for comparison.

TABLE I

*Extraction of East Texas gas oil cycle stock*

| Run No. | Solvent | Color NPA | Refractive Index ($n_D^{20}$) |
|---|---|---|---|
| 1 (control) | | >8 | 1.5407 |
| 2 | $BF_3$ | 8− | 1.5332 |
| 3 | $BF_3$-Methyl Ether complex | 7+ | 1.5290 |
| 4 | $BF_3$-Methyl Ether complex+ diluent.[1] | 5 | 1.5331 |
| 5 | $BF_3$-Ethyl Ether complex [2] | 2 | 1.4682 |
| 6 | $BF_3$-Chlorex complex | 2 | 1.4883 |
| 7 | $BF_3$-Acetic Acid Complex | 4.5 | 1.5201 |
| 8 | $BF_3$-Ethyl Acetate complex | 6+ | 1.5191 |
| 9 | $BF_3$-Propyl Acetate complex | 4.5 | 1.5028 |
| 10 | $BF_3$-α-picoline complex | 6+ | 1.4962 |
| 11 | $BF_3$-Anisole complex | 3 | 1.4913 |
| 12 | $BF_3$-Propyl Ether complex | 3.5 | 1.4837 |
| 13 | Methanol | >8 | 1.5372 |
| 14 | Nitromethane | >8 | 1.5262 |
| 15 | Aniline | 7 | 1.4913 |

[1] Pentane—2 volumes $C_5$/volume oil.
[2] Four successive dumps of fresh solvent.

The above data show the improvement in color resulting from the extraction of cycle stock with boron fluoride complexes of the present invention. Run 4 illustrates the advantage of using a diluent with the complex. Using a diluent resulted in a color improvement of about 2 units with less removal of aromatics, as shown by the higher refractive index. Runs 13–15 show that less effective color improvement is obtained with known solvents.

The decolorizing efficiency of the herein described complexes is further demonstrated by the data in Table II. These data were obtained by extracting various lubricating oil extracts at about 75° F. with the complex in the presence of pentane as the hydrocarbon diluent. The lubricating oil extracts were those obtained by extracting lubricating oil stocks for SAE 20 and 40 oils with Chlorex (beta, beta dichloroethyl ether) or with HF.

TABLE II

*Decolorization of lubricating oil extracts*

| Run No. | Feed | Solvent | No. of Dumps | Volume Diluent | NPA Color* | $N_D^{30}$ |
|---|---|---|---|---|---|---|
| 1 | SAE 20 Chlorex Extract | | | | >8 | 1.564 |
| 2 | do | BF₃-Methyl Ether Complex | 1 | 2 | 4½-5 | 1.5600 |
| 3 | do | do | 2 | 2 | 4½ | 1.5588 |
| 4 | do | do | 4 | 2 | 4½ | 1.5583 |
| 5 | do | BF₃-Ethyl Ether Complex | 1 | 2 | 4 | 1.5570 |
| 6 | do | do | 2 | 2 | 3–3½ | 1.5545 |
| 7 | do | do | 4 | 2 | 1½–2 | 1.5470 |
| 8 | do | BF₃-Ethyl Ether Complex+BF₃† | 1 | 2 | 2 | 1.5512 |
| 9 | do | BF₃-Chlorex Complex | 1 | 2 | 3 | 1.5487 |
| 10 | SAE 20 HF Extract‡ | BF₃-Ethyl Ether Complex | 4 | 6 | 2–2½ | 1.5339 |
| 11 | SAE 20 HF Extract§ | BF₃-Ethyl Ether Complex | 4 | 6 | 7 | 1.5870 |
| 12 | SAE 40 Chlorex Extract | | | | >8 | 1.579 |
| 13 | do | BF₃-Ethyl Ether Complex | 1 | 2 | 4½ | 1.5665 |
| 14 | do | do | 4 | 10 | 3½ | 1.5665 |

*Color when 3 cc. of the extract is diluted with 17 cc. kerosene.
†Excess BF₃ gas bubbled through a mixture.
‡Extract from extraction of SAE 20 lubricating oil stock with anhydrous HF at room temperature.
§Extract from heating SAE 20 lubricating oil stock with HF at 330° F., followed by HF extraction at room temperature.

The addition of excess BF₃ is particularly effective as demonstrated by comparing Run No. 7 with Run No. 8, wherein approximately equivalent results were obtained with one dump operation instead of four dump as required in Run No. 7.

The high aromaticity of the final raffinate from the HF extract feed stock (Run 11) is also noteworthy. This raffinate gave superior plasticizing properties in polyvinyl chloride.

As demonstrated by the above data the present invention is effective in improving the color of petroleum oil solvent extracts, particularly lubricating oil solvent extracts. These extracts of improved color find utility as plasticizers for resins, particularly synthetic resins such as vinyl chloride resins. The extracts from the extraction of petroleum oil stocks with anhydrous HF, particularly those involving a high temperature HF pre-treat (Run 11), are especially adapted as plasticizers because they are very highly aromatic in character.

By the term "hydrocarbon oil" as used herein and in the appended claims, we mean to include the solvent extracts of such oils.

The term "viscous hydrocarbon oil" as used herein and in the appended claims means a hydrocarbon oil having a Saybolt Universal viscosity at 100° F. above 50 seconds.

While we have described our invention by reference to various representative compounds and have illustrated the invention by means of preferred ambodiments thereof, the invention is not to be limited thereto, but includes within its scope such modifications and variations as come within the spirit of the appended claims.

We claim:

1. The method of decolorizing an organic material comprising extracting an organic material containing color bodies with a solvent consisting essentially of a complex of boron fluoride with an oxygenated alkane compound having not more than about 5 carbon atoms in the alkyl group, in the presence of an aliphatic hydrocarbon diluent, said complex being used in amounts sufficient to give a diphasic separation of a raffinate comprising essentially a substantially decolorized organic material, and an extract phase comprising essentially said complex and the color bodies extracted from said organic material.

2. The method of decolorizing an organic material comprising extracting an organic material containing color bodies with a solvent consisting essentially of a complex of boron fluoride with an oxygenated alkane compound having not more than about 5 carbon atoms in the alkyl group, and a small amount of free boron fluoride, said extracting being carried out in the presence of an aliphatic hyrocarbon diluent, said complex being employed in amounts sufficient to give a diphasic separation of a raffiniate phase comprising essentially a substantially decolorized organic material and an extract phase comprising essentially said complex and the color bodies extracted from said organic material.

3. The method of claim 2 in which an amount of free boron fluoride sufficient to give a partial pressure of from about 1 pound to about 150 pounds per square inch is used in conjunction with the boron fluoride complex.

4. The method of decolorizing a hydrocarbon oil comprising contacting an hydrocarbon oil containing color bodies with a solvent consisting essentially of a complex of boron fluoride with an oxygenated alkane compound having not more than about 5 carbon atoms in the alkyl group in the presence of an aliphatic hydrocarbon diluent, said complex being employed in amounts sufficient to give a diphasic separation of a raffnate phase comprising essentially a substantially decolorized hydrocarbon oil, and an extract phase comprising essentially said complex and the color bodies extracted from said hydrocarbon oil.

5. The method of claim 4 in which the oxygenated alkane compound is an alkane acid.

6. The method of decolorizing a hydrocarbon oil comprising contacting an hydrocarbon oil containing color bodies with a solvent consisting essentially of a complex of boron fluoride with an alkane ester having not more than about 5 carbon atoms in the alkyl group in the presence of an aliphatic hydrocarbon diluent said complex being employed in amounts sufficient to give a diphasic separation of a raffinate phase comprising essentially the substantially decolorized hydrocarbon oil and an extract phase comprising essentially said complex and the color bodies extracted from said hydrocarbon oil.

7. The method of claim 6 in which the alkane ester is an alkane acetate having not more than about 5 carbon atoms in the alkyl group.

8. The method of claim 7 in which the alkane ester is ethyl acetate.

9. The method of decolorizing a petroleum oil comprising contacting a petroleum oil containing color bodies with a solvent consisting essentially of a complex of boron fluoride with an alkane ether having not more than about 5 carbon atoms in the alkyl group in the presence of an aliphatic hydrocarbon diluent boiling within the range of from about 90° F. to about 300° F., said complex being employed in amounts sufficient to give a diphasic separation of a raffinite phase comprising essentially of a substantially decolorized petroleum oil and an extract phase comprising essentially said complex and the color bodies extracted from said petroleum oil.

10. The method of claim 9 in which the alkane ether is an ethyl ether.

11. The method of claim 10 in which the ethyl ether is beta beta dichloroethyl ether.

12. The method of decolorizing a viscous hydrocarbon oil comprising contacting a hydrocarbon oil containing color bodies with a solvent consisting essentially of a complex of boron fluoride with an oxygenated alkane compound having not more than about 5 carbon atoms in the alkyl group in the presence of an aliphatic hydrocarbon diluent boiling within the range of from about 90° F. to about 300° F., said complex being employed in amounts sufficient to give a diphasic separation of a raffinate phase and an extract phase, separating said raffinate phase comprising essentially a substantially decolorized hydrocarbon oil, a small amount of said complex and diluent and said extract phase comprising essentially said complex and the color bodies extracted from said hydrocarbon oil, and removing said complex and diluent from said raffinate and extract phases.

13. The method of claim 12 in which said diluent is employed in amounts of at least 50 volume percent based on said hydrocarbon oil.

14. The method of decolorizing a hydrocarbon lubricating oil solvent extract comprising contacting a hydrocarbon lubricating oil solvent extract containing color bodies with a solvent consisting essentially of a complex of boron fluoride with an oxygenated alkane compound having not more than about 5 carbon atoms in the alkyl group in the presence of at least 50 volume percent based on said extract of an aliphatic hydrocarbon diluent boiling within the range of from about 90° F. to about 300° F., said complex being employed in amounts sufficient to give a diphasic separation of a raffinate phase and an extract phase, separating said raffinate phase comprising essentially a substantially decolorized hydrocarbon lubricating oil solvent extract, a small amount of said complex and diluent, and said extract phase comprising essentially said complex and the color bodies extracted from said hydrocarbon lubricating oil solvent extract and removing said complex and diluent from said raffinate and extract phases.

ARTHUR P. LIEN.
BERNARD L. EVERING.
BERNARD H. SHOEMAKER.

REFERENCES CITED

The following references are of record in the file of this patent:

UNITED STATES PATENTS

| Number | Name | Date |
|---|---|---|
| 2,246,257 | Kohn | June 17, 1941 |
| 2,415,171 | Horeczy | Feb. 4, 1947 |